(12) United States Patent
Pereyra-Garcia Bustamante

(10) Patent No.: US 11,607,906 B2
(45) Date of Patent: Mar. 21, 2023

(54) TRIM PART WITH LOCKING SLIDE ON A MOTOR VEHICLE RIM

(71) Applicant: DEMMEL AG, Scheidegg (DE)

(72) Inventor: Daniel Miguel Pereyra-Garcia Bustamante, Lindenberg (DE)

(73) Assignee: DEMMEL AG, Scheidegg (DE)

( * ) Notice: Subject to any disclaimer, the term of this patent is extended or adjusted under 35 U.S.C. 154(b) by 433 days.

(21) Appl. No.: 16/428,207

(22) Filed: May 31, 2019

(65) Prior Publication Data
US 2020/0047547 A1 Feb. 13, 2020

(30) Foreign Application Priority Data

Aug. 8, 2018 (DE) .......................... 102018119327.0

(51) Int. Cl.
*B60B 7/08* (2006.01)
*B60B 7/02* (2006.01)
*B60B 7/06* (2006.01)

(52) U.S. Cl.
CPC .................. *B60B 7/08* (2013.01); *B60B 7/02* (2013.01); *B60B 7/065* (2013.01); *B60B 2900/541* (2013.01); *B60B 2900/572* (2013.01)

(58) Field of Classification Search
CPC ..... B60B 2900/572; B60B 7/065; B60B 7/02; B60B 7/08
See application file for complete search history.

(56) References Cited

U.S. PATENT DOCUMENTS

| | | |
|---|---|---|
| 5,803,552 A | 9/1998 | Kato et al. |
| 6,247,760 B1 * | 6/2001 | Kinoshita ................. B60B 7/02 |
| | | 301/37.34 |
| 7,147,289 B2 * | 12/2006 | Nakamura ................ B60B 7/08 |
| | | 301/37.28 |
| 11,407,252 B2 * | 8/2022 | Pereyra-Garcia Bustamante ........ |
| | | B60B 7/065 |
| 2011/0101766 A1 | 5/2011 | Chinavare et al. |

FOREIGN PATENT DOCUMENTS

| | | |
|---|---|---|
| DE | 102015206831 | 10/2016 |
| DE | 102017211695 | 1/2019 |

OTHER PUBLICATIONS

German Patent and Trademark Office, Office Action for German Patent Application No. 10 2018 119 327.0, dated Oct. 20, 2021.

* cited by examiner

*Primary Examiner* — Scott A Browne

(74) *Attorney, Agent, or Firm* — Faegre Drinker Biddle & Reath LLP

(57) ABSTRACT

Decorative trim panel on a motor vehicle wheel consisting of at least one plate-shaped trim part which at least partially covers the visible side of the motor vehicle wheel and which can be settleable in a load-transmitting manner to the spokes and/or to the rim ring of the wheel by a counter holder and/or latch, the counter holder/latch on the trim part side are formed from at least one latching foot which is integrally formed on the surface of the trim part, a hook head integrally formed thereon, and in that the latching foot is part of a latching connection on the trim part, the bending of which is effected by a locking slide formed to be displaceable and lockable in a latching gap of the latching connection and selectively consolidates or releases the latching connection and thereby bends or returns the latching foot towards the rim side.

20 Claims, 14 Drawing Sheets

TRIM PART WITH LOCKING SLIDE ON A MOTOR VEHICLE RIM

CROSS-REFERENCE TO RELATED APPLICATION

Figure 1:
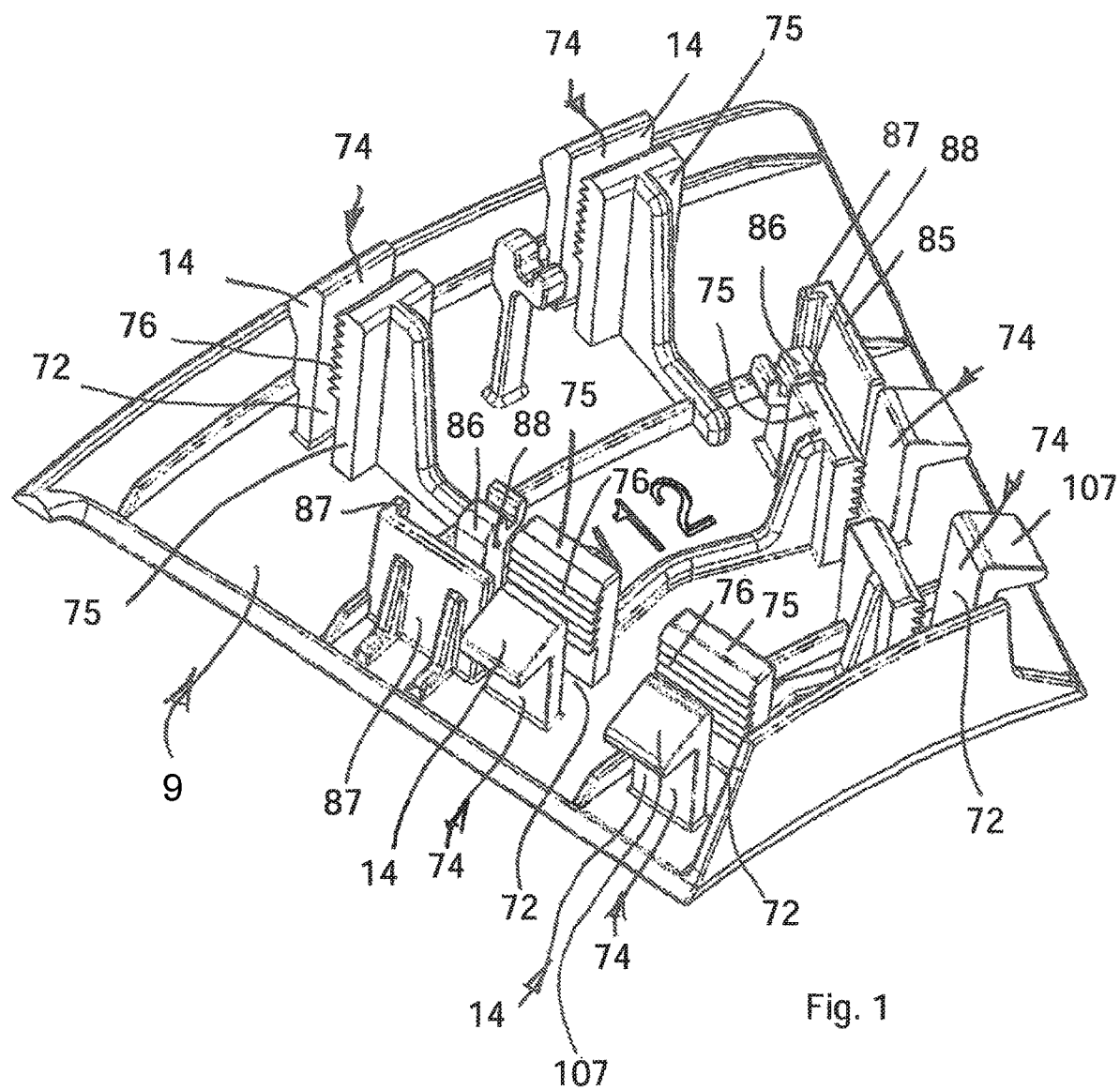

The present application claims priority to DE 102018119327.0, filed Aug. 8, 2018, the entire disclosure of which is hereby expressly incorporated herein by reference.

BACKGROUND/SUMMARY

The present disclosure relates to a trim part on a motor vehicle wheel.

Such a trim part became known, for example, from the subject of the US 2011/0101766 A1, in which the trim part consists of a disc-shaped decorative panel, which is fastened with the aid of two latchable latching plates to assigned recesses in the respective spoke of the motor vehicle wheel. The first latching plate is inserted through radial slots in the decorative panel from the front and wedges itself into the radial slot in the wheel behind it, wherein the slot on the wheel side must be perfectly aligned with the slot in the decorative panel. The second latching plate is placed on the decorative plate, reaches through the radial slot of the decorative plate and is latched to the second latching plate wedged into the slot on the wheel side.

The wedging of the first latching plate in the wheel slot cannot transmit high forces and is sensitive to moisture and dirt. Disassembly is not possible without destruction.

Another disadvantage is that it is not possible to fasten a multi-segmented trim part consisting, for example, of a large number of circumferentially extending interrupted decorative plates which do not have a circumferential connection between them.

Another disadvantage of the known fastening of a trim panel to a motor vehicle wheel is that the production tolerances in the manufacture of the wheel, which lead to a mutual misalignment of the slots on the wheel side inside the wheel, cannot be controlled with the type of fastening shown there.

In particular, it may happen that the radial slots in the disc-shaped trim part are not exactly aligned with the assigned radial slots in the spoke of the vehicle wheel, so that it is not possible to latch the latching means used and therefore fasten the wheel trim panel.

From the subject of DE 10 2015 206 831 A1, another motor vehicle wheel has become known in which a disc part is screwed onto a wheel ring and the disc part is covered with additional decorative members which are essentially circular segment shaped and have only simple latching bolts which are intended to engage in assigned latching bores of the disc part.

Also here the problem exists that the latching connection cannot be adjusted because the latching bolts must be arranged to align exactly opposite to the disc part of the wheel, otherwise these parts cannot be fastened.

The object of the disclosure is therefore to fasten a trim part of the type mentioned at the beginning, which is preferably designed as a circular-segment-shaped plate part, to the front or visible side of a vehicle wheel in such a way that it can be easily assembled and disassembled and that the tolerances on the wheel side no longer have any influence on the fastening of the trim part.

In order to solve the problem, the disclosure is characterized by the technical teaching of claim 1.

From the subject of the earlier patent application DE 10 2018 108 149, which goes back to the same applicant, a trim part of a motor vehicle wheel has already become known. The entire disclosure of DE 10 2018 108 149 is hereby explicitly incorporated by reference herein.

In the earlier patent application mentioned above, latching slides 41 have been described, which ensure a favorable assembly and determination of the entire motor vehicle trim part to the spokes of a motor vehicle wheel.

However, the disassembly is difficult because the latching slides described there can only be released by breaking off the latching connection, which leads to the destruction of the trim part.

But there is a need to improve a motor vehicle trim part for the assembly on motor vehicle wheels in such a way that it is also possible to disassemble a motor vehicle trim part once it has been assembled without destroying it.

This is achieved in a preferred embodiment by the fact that the counter-holding means on the trim part side consists of at least one bendably formed latching foot integrally formed on the surface of the trim part, with a hook head integrally formed thereon, and that the latching foot is part of a latching connection on the trim part, the deflection of which is effected by a locking slide which is designed to be displaceable and lockable as an expanding element in a latching gap of the locking connection and selectively consolidates or releases the latching connection and thereby bends or retracts the latching foot towards the wheel side.

The earlier patent application proposes a special shape of latching sliders 41, which are characterized by the fact that they can be displaced only perpendicularly to the surface of the respective trim part 9, 10 (in the arrow direction 83) and can be settleable in the area of barbed hook plates in a non-detachable manner in the latching gap of the latching connections 74. The latching slides 41 described there are fitted with a base leg 56 on the back of the spoke 2, 3 in a load-transmitting manner and thereby form the counter bearing of the trim part on the spoke or on the wheel ring. Such a design with a latching slide 41 is also intended in the scope of the present disclosure.

However, the disclosure provides as a preferred feature over the older patent application that in the area of the latching connections 74 described a locking slide 91 is provided which is displaceable in two mutually perpendicular directions and which is now also designed to be displaceable and lockable in the radial direction of the trim part and the motor vehicle wheel and which—as known from the earlier patent application—can also be displaced in the perpendicular direction to the surface of the trim part into its locking position. However, this innovative locking slide itself does not form a load-transmitting contact on the back of the spoke 2, 3 or the wheel ring 6, as described in the earlier patent application using the example of the latching slide 41. Rather, it serves for deflection of the hook head of a latching foot on the trim part side which, when the latching foot is bent outwards, abuts with its hook head on the back side or the lateral surface or other load-transmitting surfaces on the wheel side.

The locking slide according to the present disclosure is therefore merely an expanding element which—in accordance with its displacement—widens the latching gap between a slightly bendable counterholder on the trim part side and a bendable latching foot on the trim part side in such a way that the latching foot with its hook head comes into load-transmitting abutment with counter surfaces on the wheel side.

The disassembly takes place in the opposite direction, because the locking slide can be displaced from its expanding position in the opposite direction and the expanding effect in the latching gap is thereby reduced, whereby the hook head of the latching foot is released from the load-transmitting counter surface on the wheel side. The locking slide can be operated for assembly and disassembly with or without tool assistance.

Thereby, according to the disclosure, another and additional function, namely a disassembly function, is assigned to the latching slide 80 described in the earlier patent application in the present description of the disclosure.

In the earlier patent application, the latching slide could only be displaced in the perpendicular direction to the surface of the trim part and could only be locable with its barbed hook plates to the latching receptacles on the trim part side.

The present disclosure now provides that the latching slide known from the earlier patent application, which can only be displaced in a perpendicular direction to the surface of the trim part, is now also assigned a radial displacement movement parallel to the surface of the trim part and directed perpendicular to it. This ensures an improvement in assembly and disassembly.

Two different shapes of locking slides are described, wherein the first embodiment is aimed at a locking slide, which is freely guided with its outer surfaces on the back of the trim part in a first type of displacement guide. However, this first displacement guide has no inner guide groove—like the second type of displacement guide. The second type of displacement movement offers even better guidance in the radial direction.

The second embodiment refers to a different type of locking slide, the longitudinal guidance of which takes place in the area of an internal guide groove of the locking slide, so that the displacement movement is not only guided in an exposed position on the outside, as in the case of the first locking slide, but also via internal guide grooves.

Both embodiments have in common that, in order to produce the locking movement, first of all an unlocked position of the respective locking slide is provided, which is pulled outwards in the radial direction—for example in the direction of the wheel edge—and there is in a raised position.

To produce the locking, the locking slide is displaced from this raised, radially outwards directed slide position into a radially inwards directed slide position before it is fastened on certain stop surfaces on the trim part side, and is then brought into its final latching position with a pressure movement of a hand or a tool perpendicular to the surface of the trim part and this causes the respective latching connections on the trim part side to be expanded apart and the latching hooks assigned to the latching connections to abut with their hook heads against the counter surfaces on the wheel side in a load-transmitting manner.

To unlock this connection, it is possible to unlock the locking slide from its lowered and radially inwards displaced position by effecting a counterholder with a suitable tool or by hand, which forms a rear stop for the locking position of the locking slide.

This counterholder is bent away from the locking slide with a suitable tool so that the stop edge of the locking slide does not engage with the stop edge of the counterholder, and therefore the locking slide can be moved out again in the radial direction while maintaining its lowered position, whereby the locking position is unlocked.

This means that the load-transmitting abutment of the respective hook heads of the latching feet, which are part of the latching connections, is lifted at the assigned counter surfaces of the spoke of the motor vehicle wheel and the trim part can therefore be easily removed again.

An advantage of the disclosure is that the locking slide is an easily movable plastic part which is held in a displacement guide on the trim part side, which in the first mentioned design example of a locking slide consists of guide surfaces on the trim part side which are directed towards one another and which abut against the outside of the locking slide and form its radial displacement guide on the trim part.

In the second embodiment, the locking slide has a downwardly open guide groove into which a latching plate on the trim part side engages, which has a radially outwards directed latching lip which hooks into the barbed hook plate of the locking slide.

As soon as the latching plate is bent backwards with a tool described above, the latching lip also comes out of engagement with the barbed hook plate of the locking slide and this can then be moved freely on the latching plate.

In the first mentioned design example, the latching plate is missing and has been replaced by a guide plate on the trim part side, which abuts to the outside of the locking slide but is not part of an internal guide groove. Another guide plates can also be provided to improve the stability or guidance of the locking slide. An example would be to install a guide plate between the two latching feet. It would not be necessary to provide such guide plates with stop edges.

Of course, the disclosure is not limited to the described two types of displacement guides of a locking slide in the area of the latching connections and in the latching gap formed between the latching connections of a trim part.

All other displacement guides can be used, e.g. guide rails, guide profiles or even roller-type or dome-shaped guide members which are arranged on or at the trim part.

Spring members can also be provided, which take over a radial displacement guide of the respective locking slide.

It is advantageous that the locking slide is locked in the locked position by the unlocked plate described above, i.e. it is fixed and can no longer be moved back from its locked position without tool assistance.

In the unlocked state, the unlocked plate makes a latching engagement with the locking slide. If the unlocked plate is bent back with a suitable tool, then it gets out of latching engagement with the locking slide and this can therefore be displaced freely in its displacement guide to the radially outwards end locking position.

In a preferred embodiment, the locking slide consists of two locking plates spaced apart from each other, which are connected to each other in their upper area by a transverse yoke in one piece made of material. The transverse yoke forms a downwardly opened U-shaped recess, wherein the size of the recess and its profile corresponds to the profile of the latching foot, so that the locking slide with its downwardly directed central recess can be pushed onto the profile of the respective latching foot and therefore a first securing layer is provided which corresponds to the unlocked position.

Therefore the recess, in connection with the assigned stop edges, defines an approximately U-shaped profile in which the profile of the respective latching foot engages with little play.

From the first layer secured position, which identifies the unlocked locking slide, the central recess of the locking slide is disengaged from the rear latching foot when the locking slide is moved forward in the radial direction of the trim part.

The two locking plates, which are thickened in the cross-section, thereby enter the latching gap of the respective latching connection on the trim part side, and by pushing the locking slide down from its radially forward pushed position, the two spaced-apart locking plates of the locking slide now press into the latching gap between the latching connections on the trim part side and push the latching gap apart, whereby the outwardly directed latching feet on the trim part side of the outer circumference are bent outwards and their outwardly directed hook heads abut in a load-transmitting manner on the assigned surfaces of the motor vehicle wheel.

The subject matter of the present disclosure results not only from the subject of the individual claims, but also from the combination of the individual claims.

All the information and characteristics disclosed in the documents, including the abstract, in particular the spatial configuration depicted in the drawings, form a part of the disclosure, The use of the terms "substantial" or "according to the disclosure" or "essential for the disclosure" is subjective and does not imply that the characteristics so designated must be necessarily part of one or more claims.

In the following, the disclosure will be explained in more detail using drawings representing only one way of execution. The drawings and the description of the disclosure also show other essential features and advantages of the disclosure.

Figure 2:
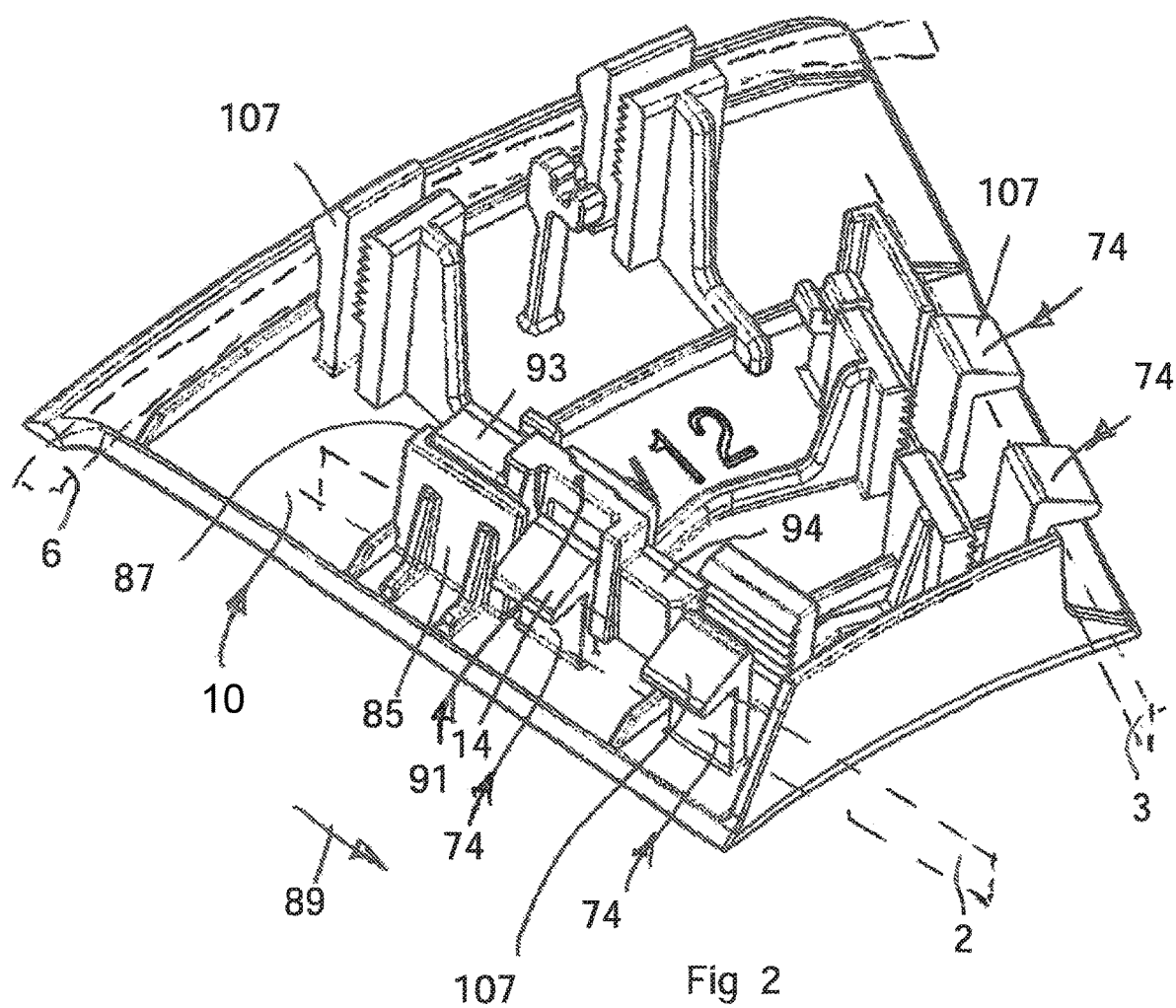
Figure 3:
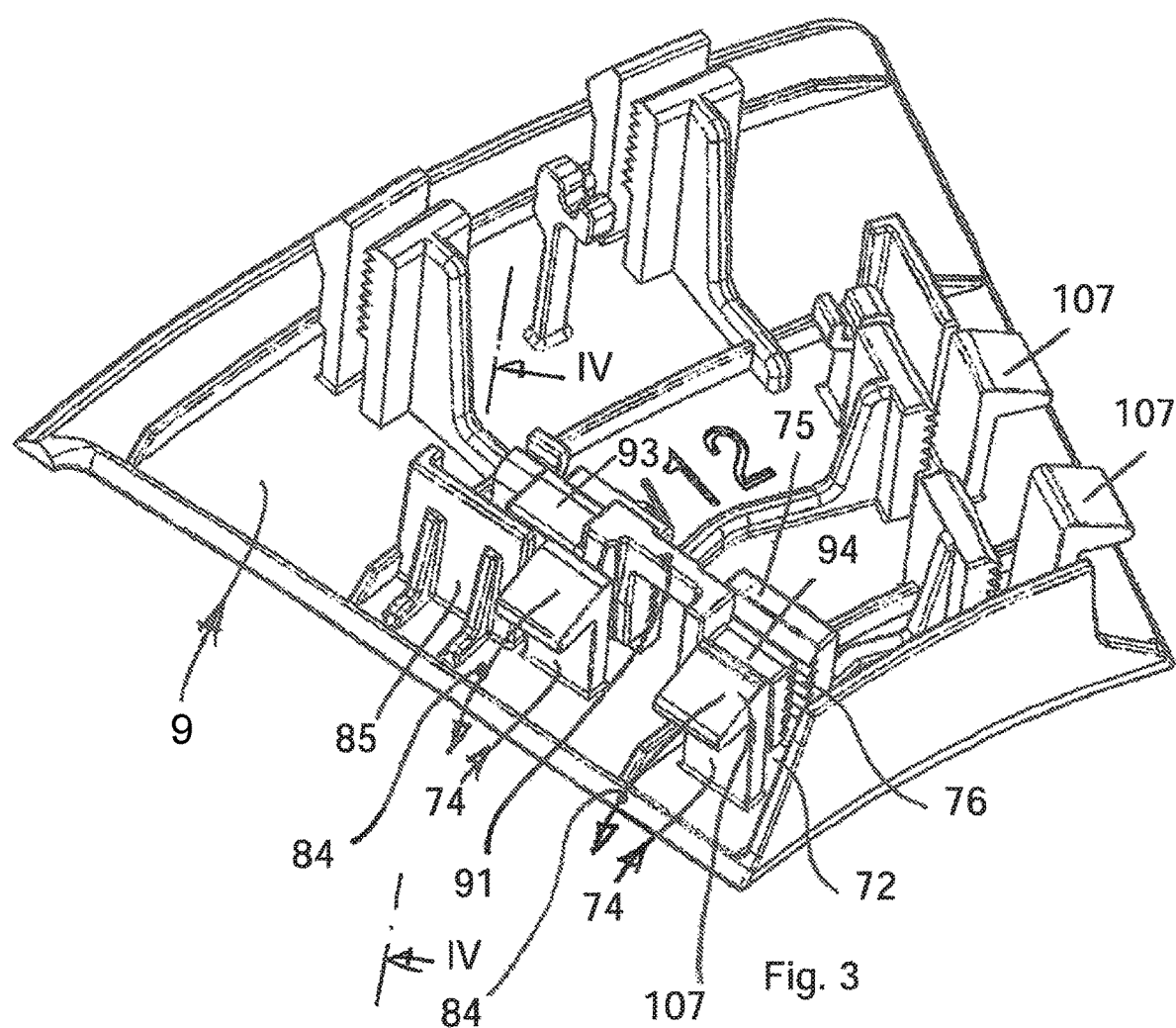
Figure 4:
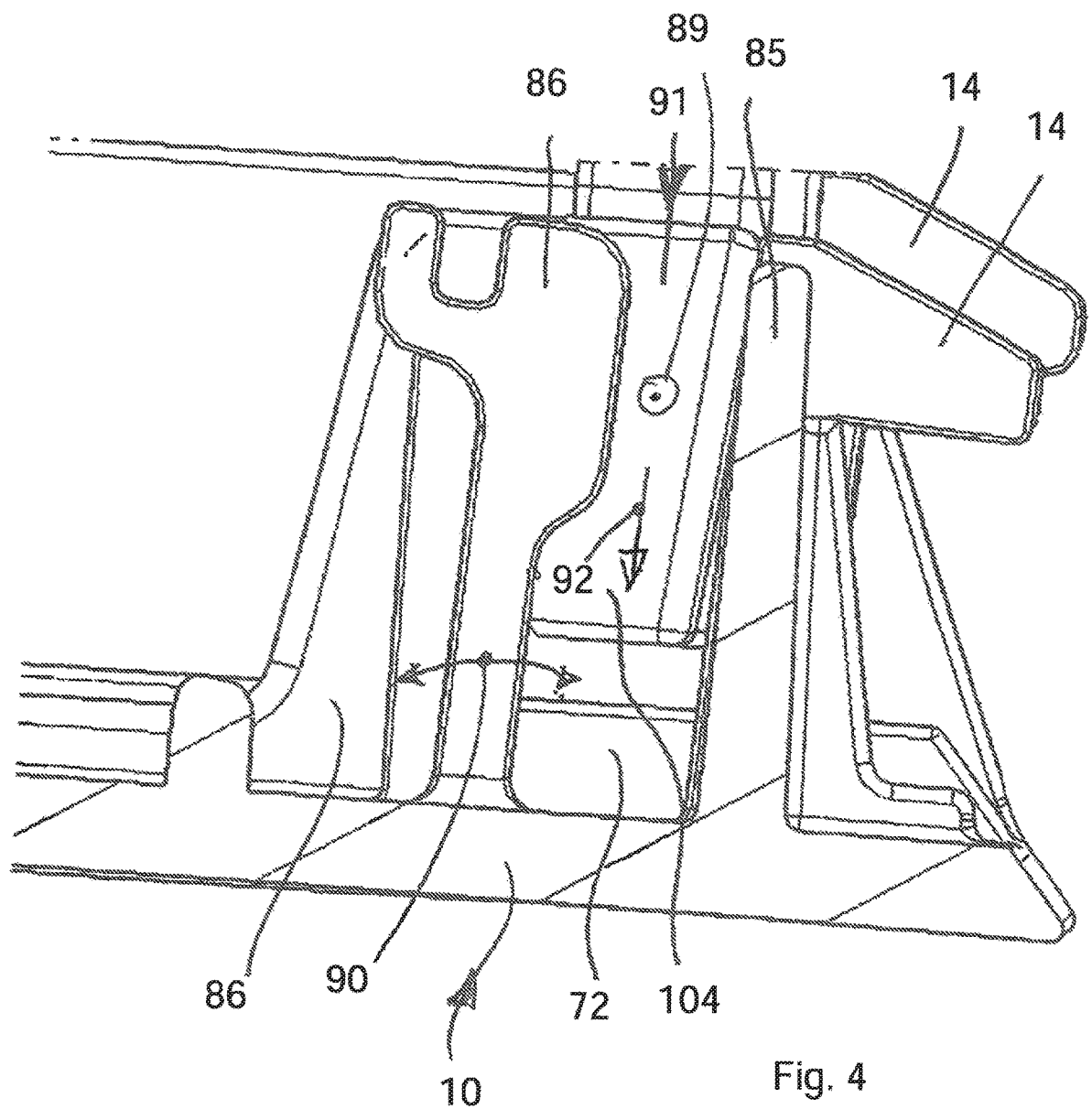

In which:

FIG. 1: shows a perspective view of a trim part with an embodiment of a first latching connection—but without locking slide FIG. 2: shows the same representation as FIG. 1, with a locking slide in its unlocked position on the left side FIG. 3: shows the same representation as FIG. 2 in the locked position of the locking slide FIG. 4: shows a section according to IV-IV line in FIG. 3

Figure 5:
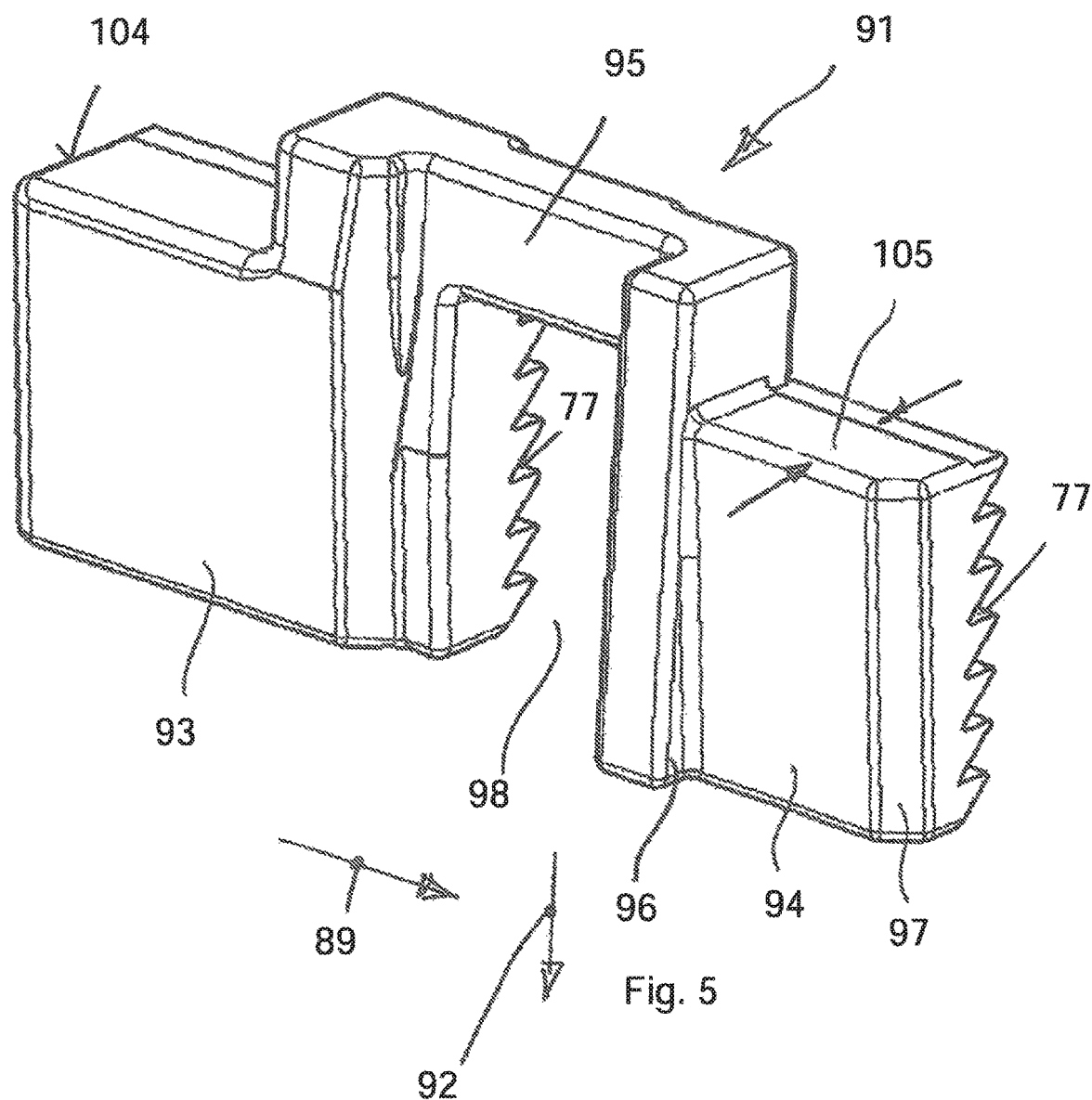

FIG. 5: shows a perspective view of the locking slide

Figure 6:
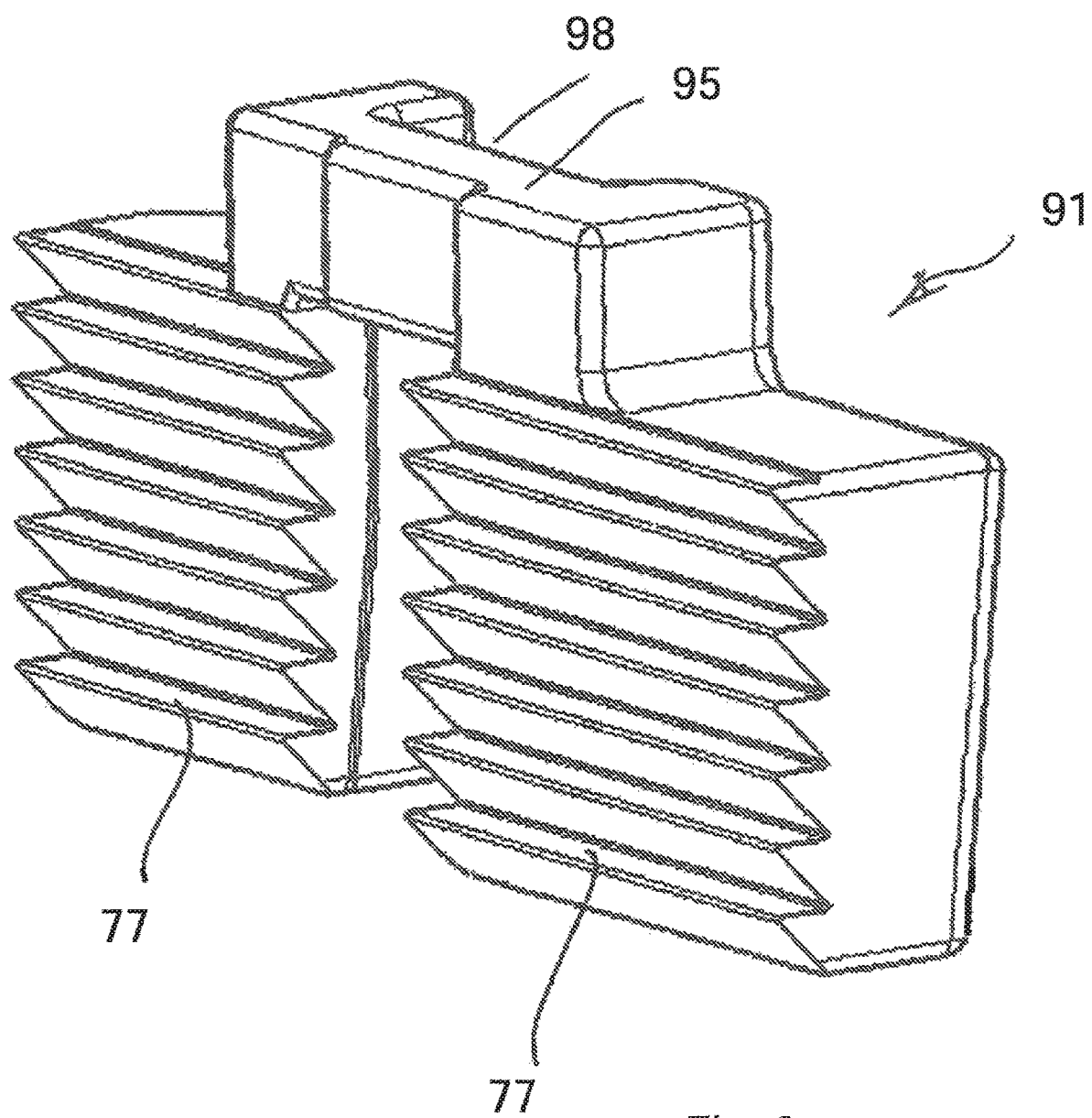

FIG. 6: shows the rear view of the locking slide according to FIG. 5

Figure 7:
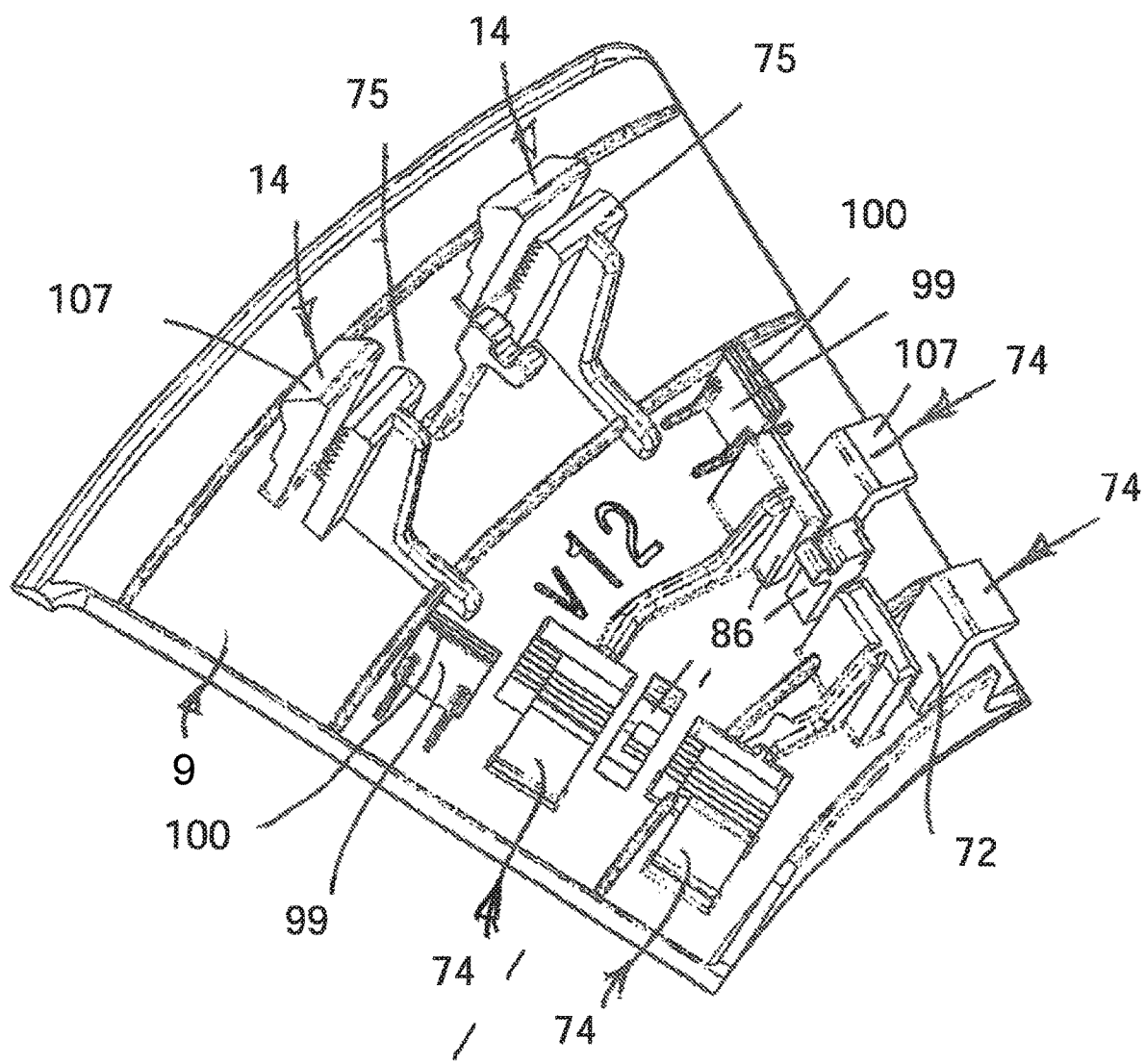
Figure 8:
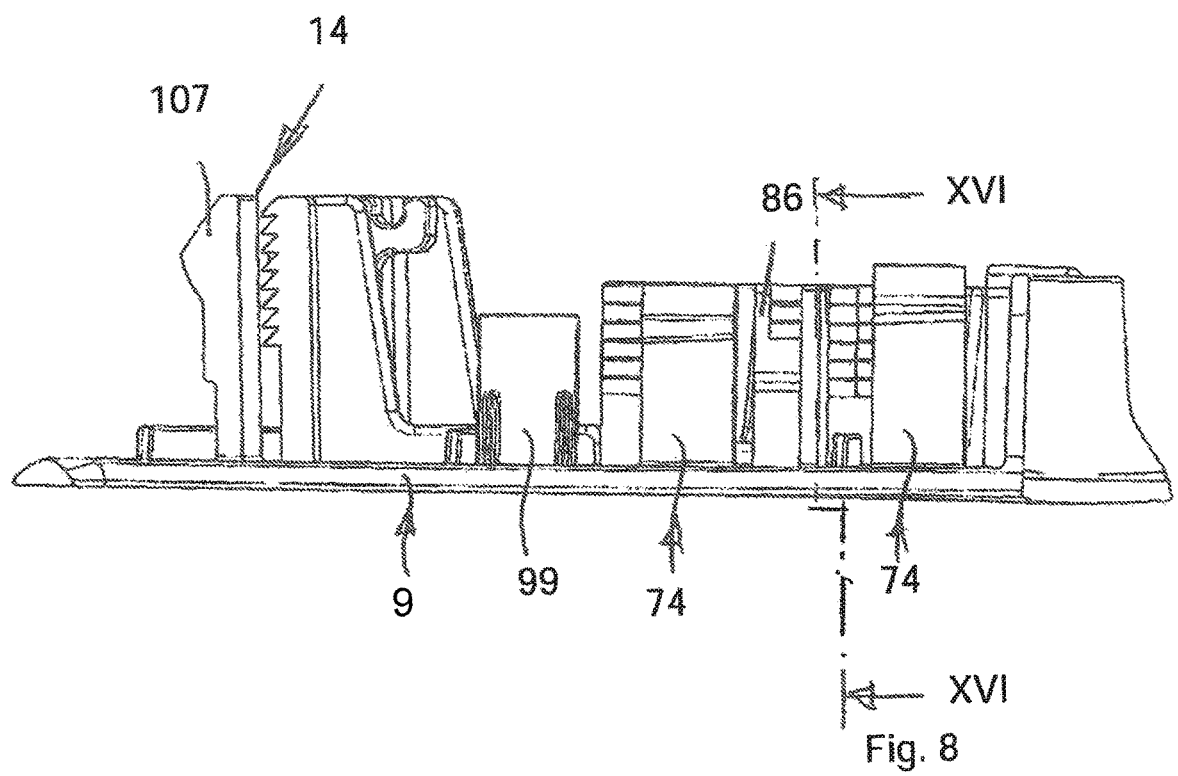

FIG. 7: shows the perspective representation of a second embodiment of a trim part with disassembly function, but without the representation of the locking slide FIG. 8: shows a section according to VIII line in FIG. 7

Figure 9:
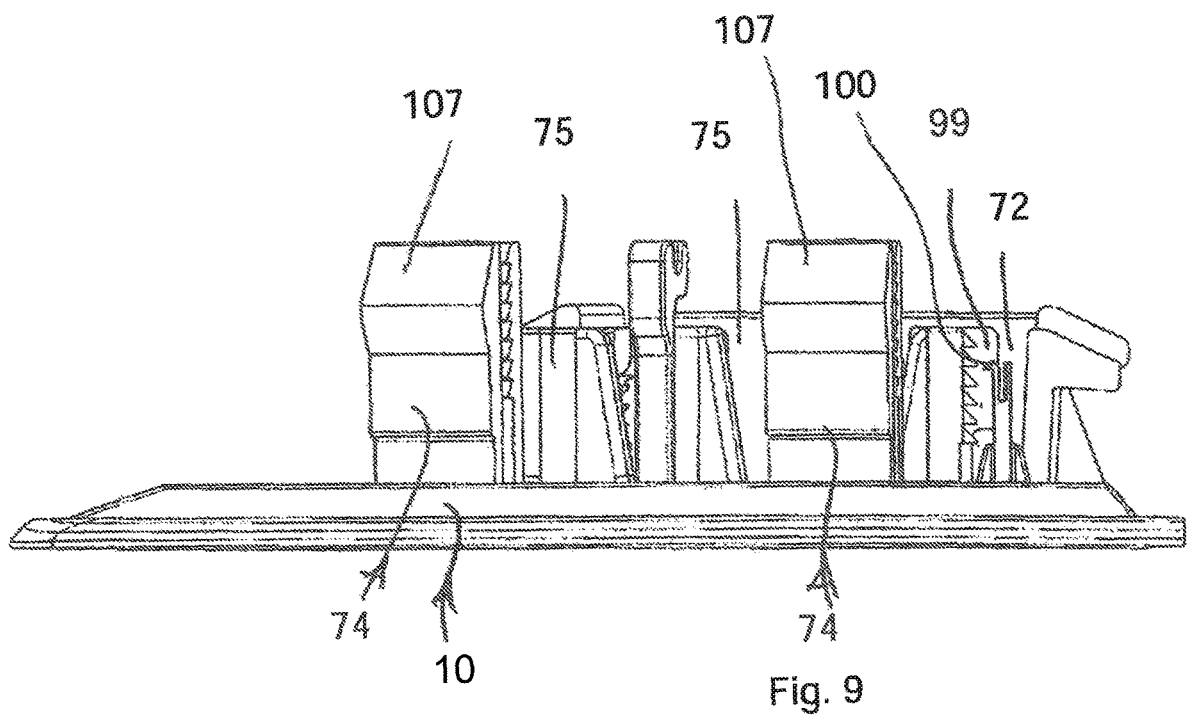

FIG. 9: shows a side view of the arrangement in FIG. 7

Figure 10:
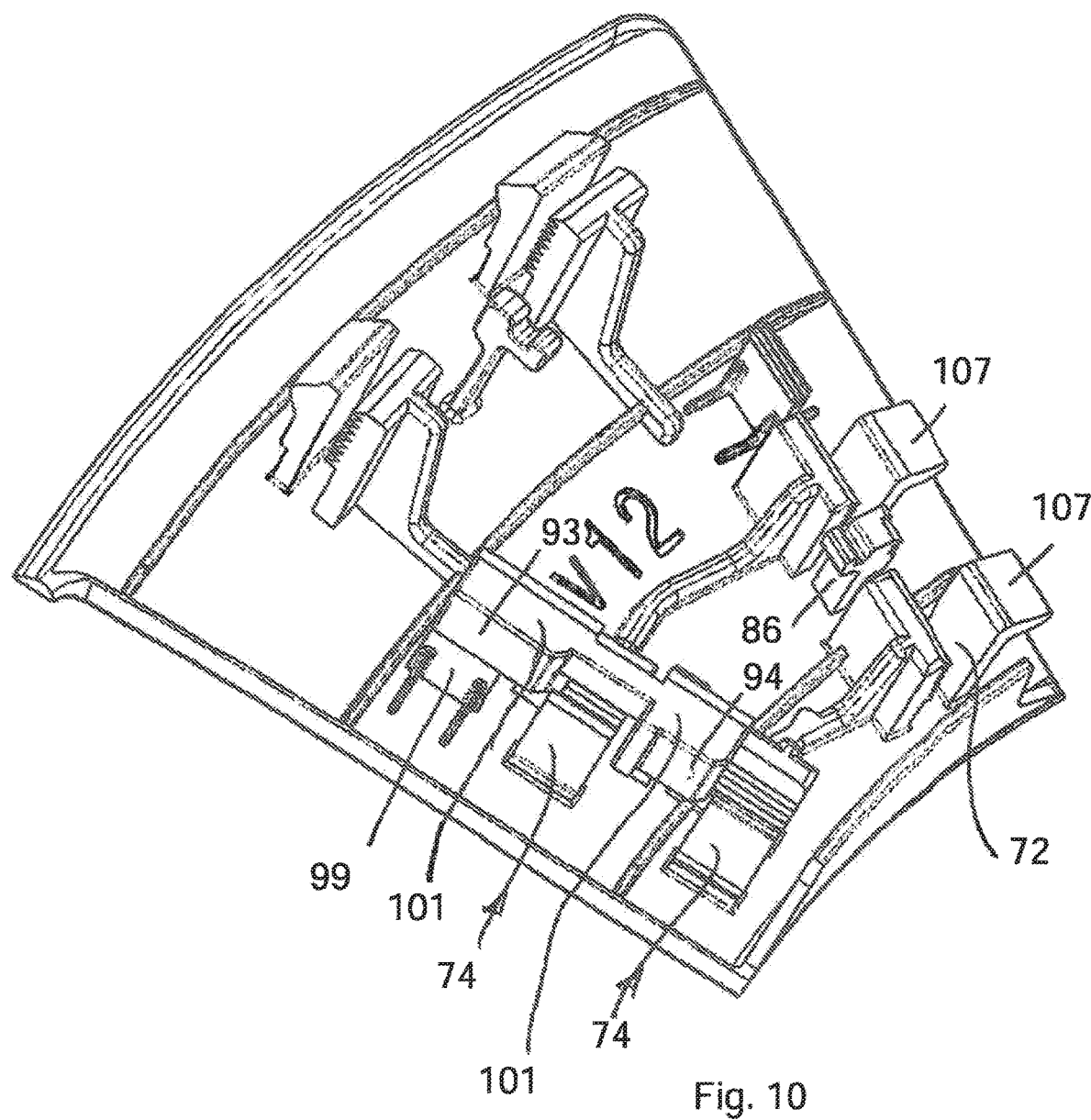
Figure 11:
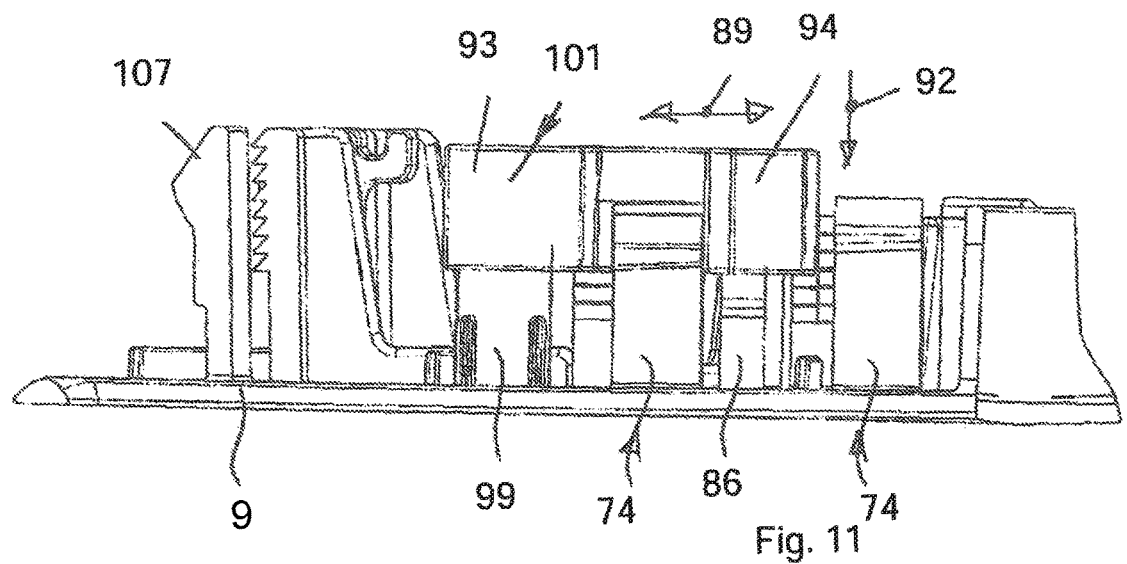
Figure 12:
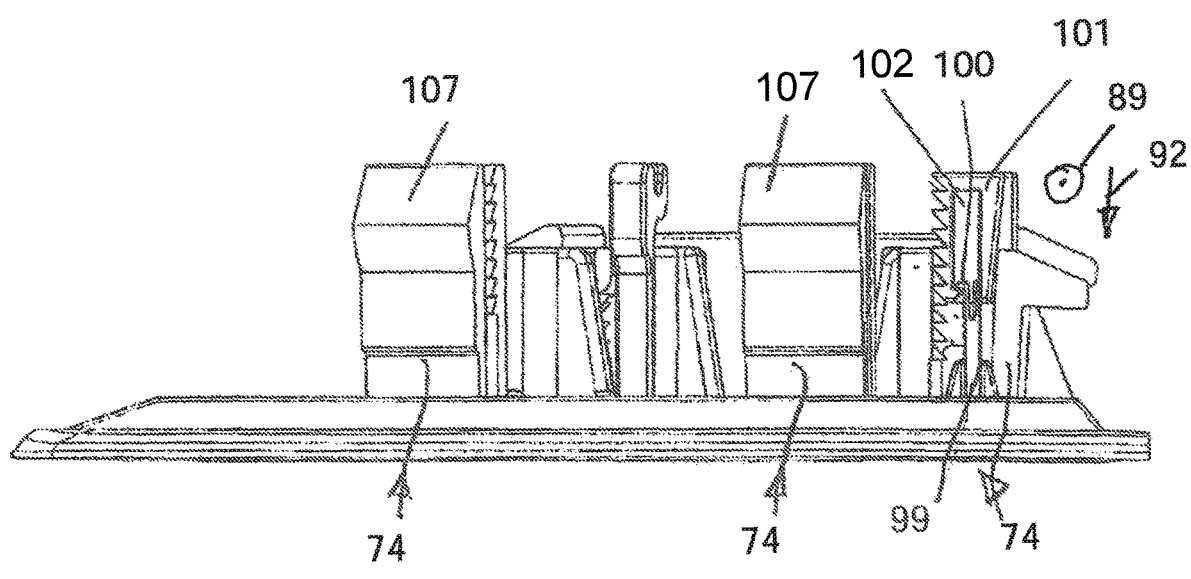
Figure 13:
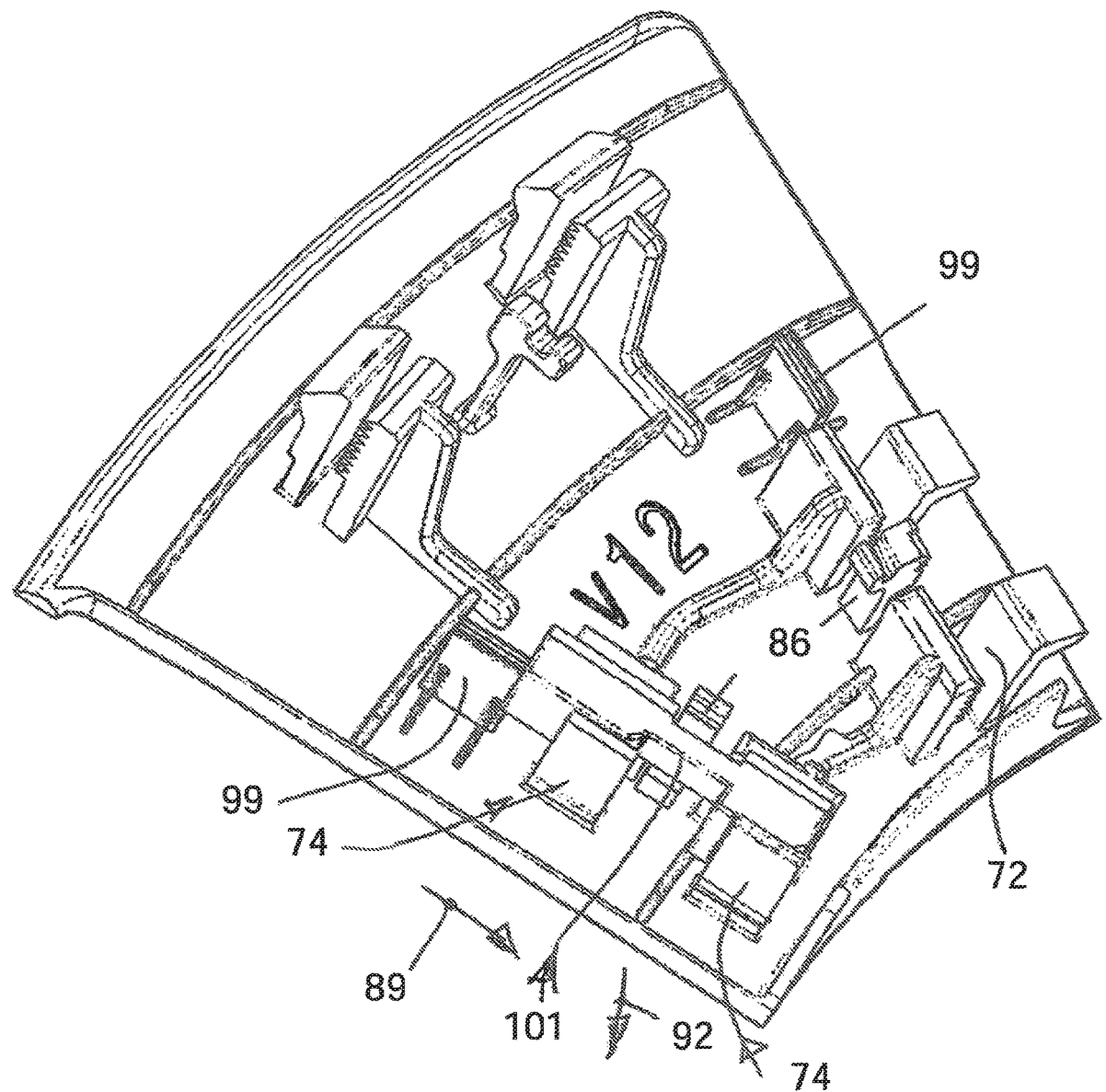
Figure 14:
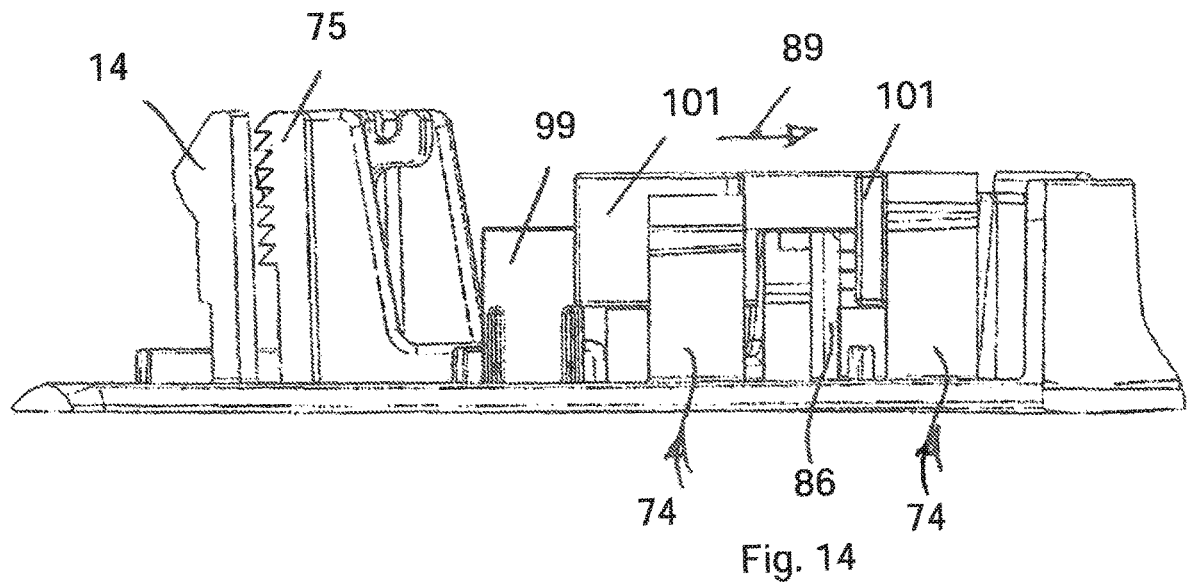

FIG. 10: shows the design example according to FIG. 7 with the locking slide inserted, but in the unlocked position FIG. 11: shows the side view of the arrangement with unlocked locking slide FIG. 12. shows the representation rotated by 90° with the unlocked locking slide represented FIG. 13: shows a perspective representation similar to the representation in FIG. 10 with a locking slide in the locking position FIG. 14: shows the side view of the representation according to FIG. 13

Figure 15:
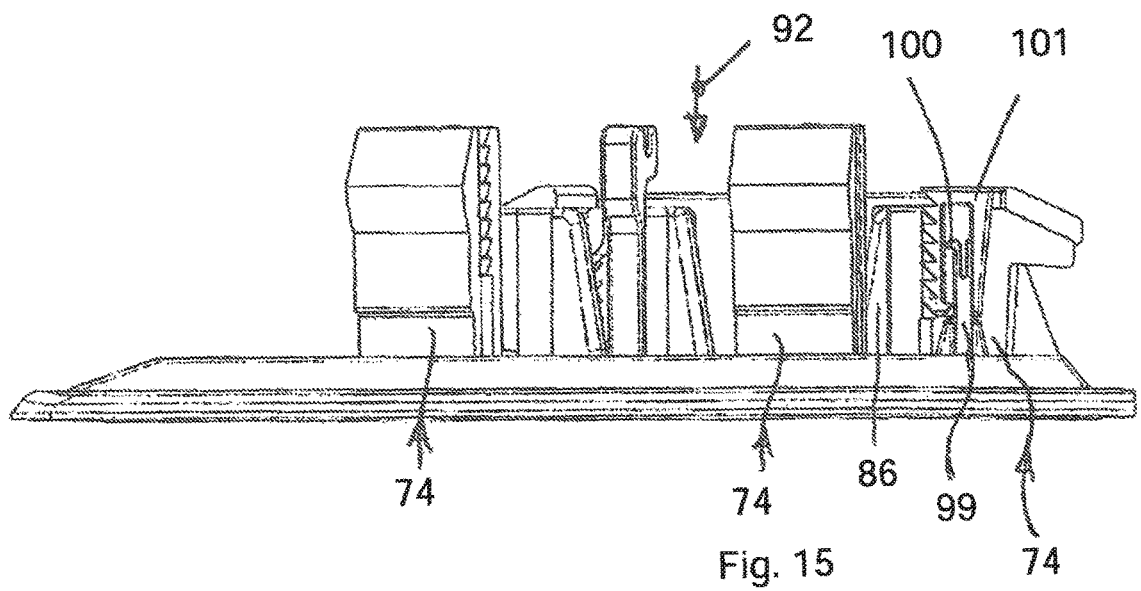

FIG. 15: shows the representation rotated by 90° compared to FIG. 14

Figure 16:
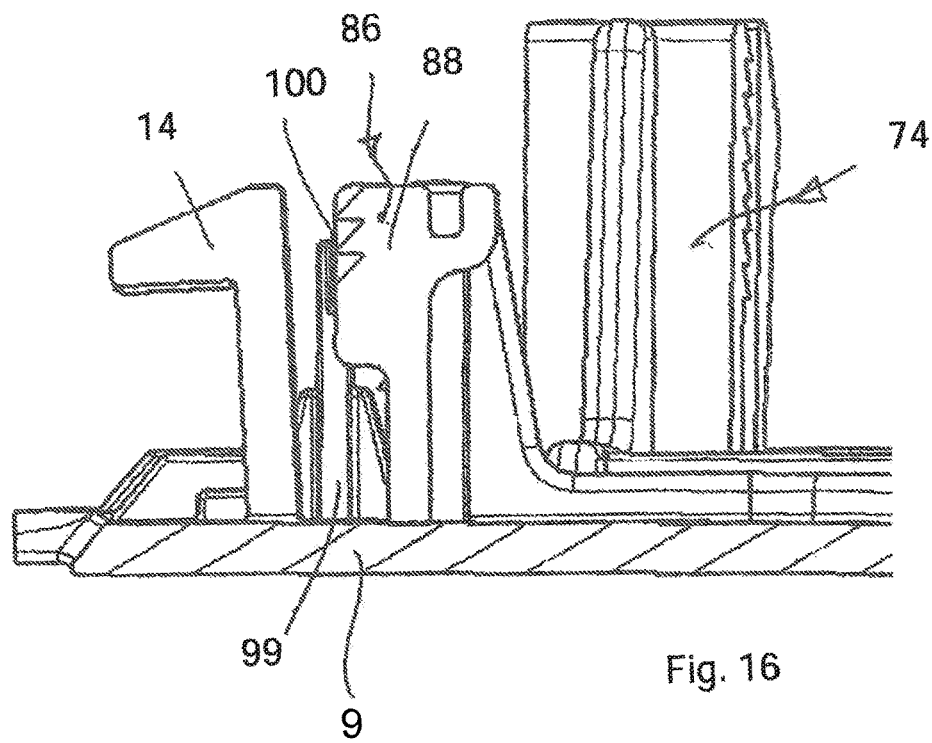

FIG. 16: shows a section according to XVI-XVI line in FIG. 8

Figure 17:
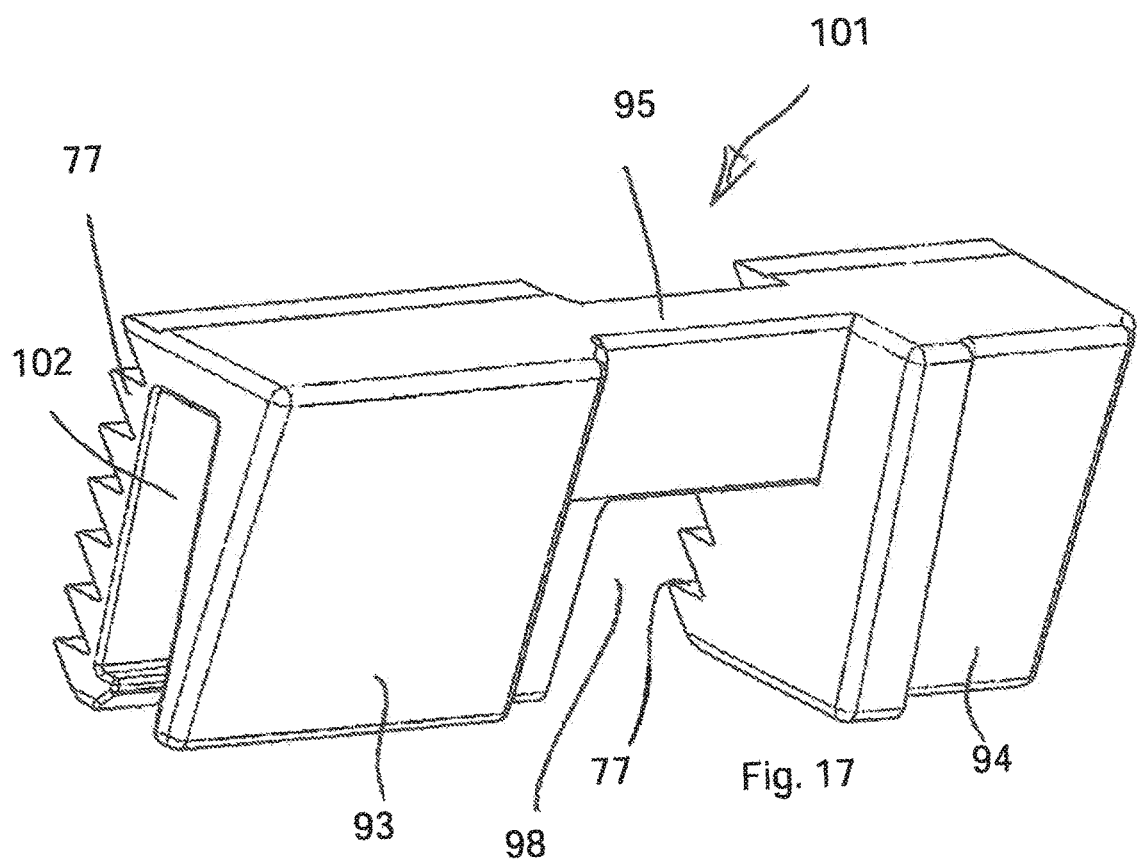
Figure 18:
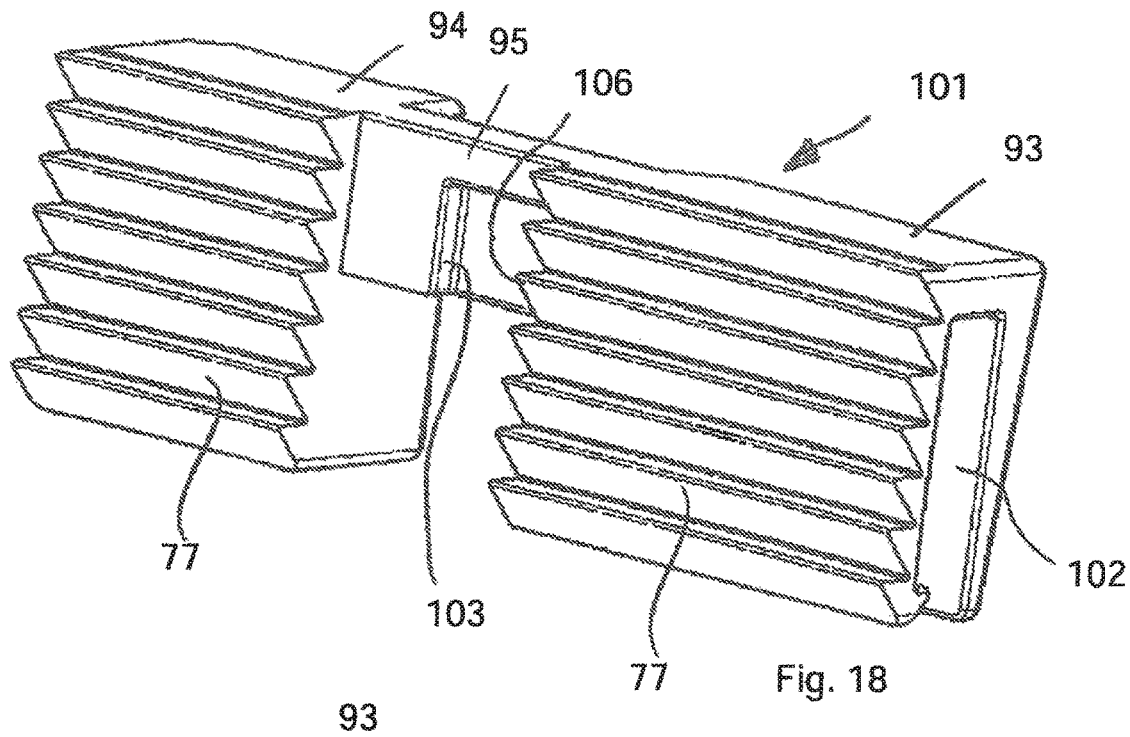

FIG. 17: shows a perspective representation of the second embodiment of the locking slide FIG. 18: shows the representation of the locking slide rotated by 90° according to FIG. 17

Figure 19:
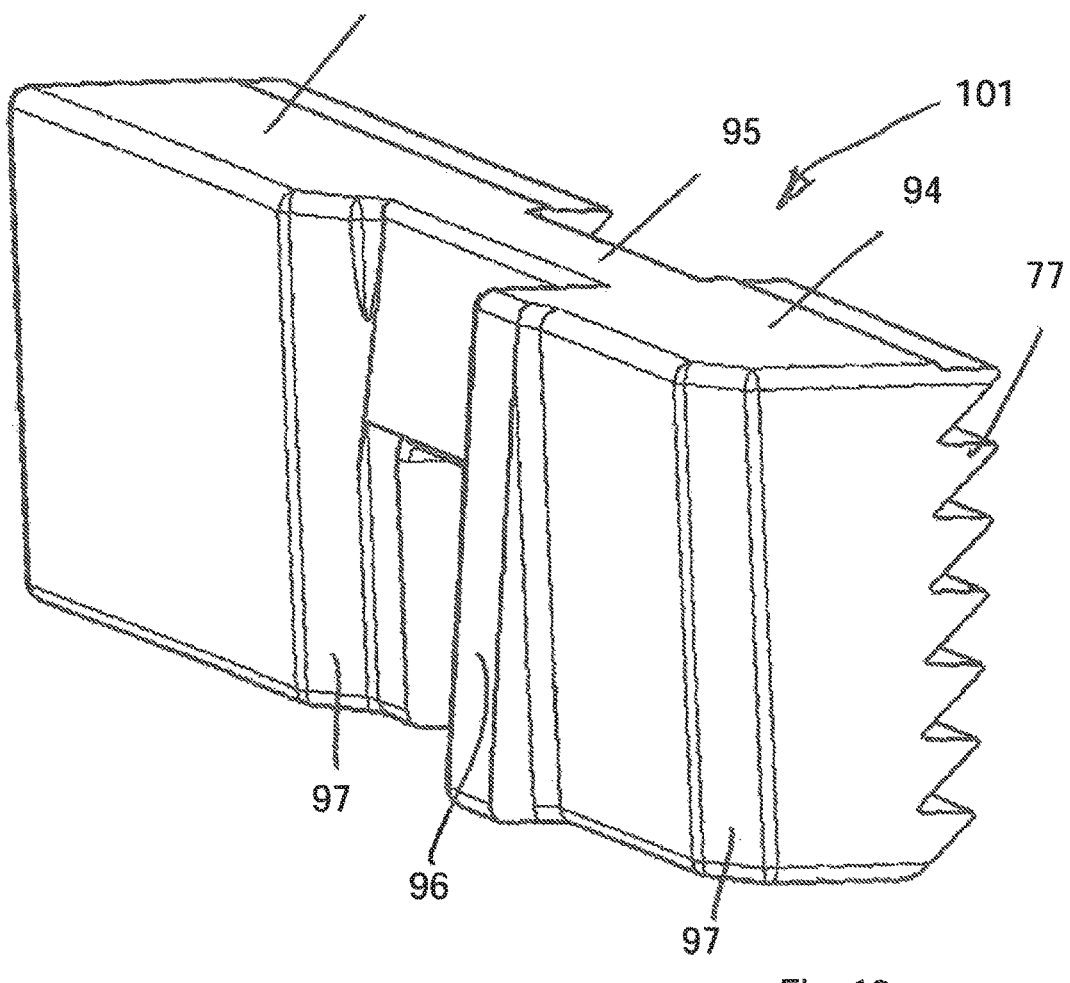

FIG. 19: shows a rotated representation of the locking slide compared to FIG. 17

Insofar as certain reference signs have been used in the description of the disclosure above, the reference signs 9, 10, 14, 41, 56, 72, 74, 75, 77, 80, 83, 84 refer to the reference signs of the earlier patent application DE 10 2018 108 149, and the same description of the earlier patent application applies to these parts.

FIG. 1 shows in general that there are a number of latching connections 74 on the trim part side on the outer circumference of the trim part 9, 10. The latching connections are determinated at the spokes 2, 3 and/or at the wheel ring 6.

The trim part 9 designates a relatively small trim part, while the reference sign 10 designates a large trim part.

The two reference signs 9, 10 are always used, which means that the trim part 9, 10 can be arbitrarily formed in its surface extension. It can therefore be designed with a large or small surface area.

Further, FIG. 1 shows that at the edge, i.e. at the radially outer edge, there are a number of latching connections 74 which cooperate with latching feet 14 and into which a latching slide 41 can be latched, which is described in the earlier patent application. Such a latching slide 41 can be assembled, but can only be disassembled by destroying the latching connection 74. However, instead of using the latching slide 41, the principle of bending the latching feet 14 can also be used, whose hook heads 107 can be bent outwards using the locking slide 91.

It is advantageous that a locking slide 91 and/or 101 can also be inserted in the latching gap between the latching foot 14 and the counterholder 75, so that the radially external latching connection 74 to the abutment on the wheel ring 6 can also be equipped with the locking slides 91 and/or 101 as shown in FIGS. 1-10.

An advantage of the design example according to FIG. 1 is that the latching connections 74, which extend on the lateral surfaces in the radial direction and are spaced apart from one another and each consist of a latching foot 74 and an opposite-spaced counterholder 75, form a latching gap 72, into which a locking slide 91 is designed to be displaceable in the radial direction of the wheel 1 and to be lowerable in the direction of the surface of the trim part 9, 10.

In all design examples, the latching connections 74, which extend in the radial direction of the wheel 1 and are spaced apart from one another, each consist of an internal counterholder 75, which has a barbed hook plate 76.

It is advantageous to have two counterholders 75 arranged at a mutual distance from each other and form a latching gap 72 in connection with the respective external, opposite latching foot 14, which does not carry a barbed hook plate.

By the insertion of the locking plates 93, 94 of the locking slide 91, which are enlarged in thickness, the latching gap 72 is enlarged and the latching feet 14 are bent outwards, whereby their hook heads 107, with their hook-like attachments, are applied in a load-transmitting manner to assigned surfaces of the spoke 2, 3 or the wheel ring 6 of the motor vehicle wheel 1.

In the first design example of FIGS. 1 to 6 shown, the displacement guide for a locking slide 91 to be explained later is formed by the fact that a guide plate 85 is integrally formed with its longitudinal extension approximately perpendicular to the surface of the trim part 9, 10, which, in connection with an opposite unlocking plate 86, forms a first guide opening for the locking slide 91, wherein the guide opening extends in alignment with the latching gap 72 of the latching connections 74 adjoining it behind.

At the outer edge of the guide plate 85 a stop edge 87 is designed for the stop limitation of the locking slide 91 which can be formed in this dispaced guide gap.

As a result of the enlargement of the latching gap 72, the latching feet 14 bend outwards in the arrow direction 84 (see FIG. 3) and therefore apply themselves in a load-transmitting manner to the assigned surfaces of the motor vehicle wheel 1 which are not shown in detail.

The unlocking plate 86 forms a front stop edge 88 for the locking slide 91, so that when the unlocking plate 86 is bent backwards in the opposite direction to the arrow direction 84 drawn in by means of a suitable tool or the human hand, it is disengaged from the stop edge 88 and can therefore be brought into its retracted unlocked position until it fastens the stop edge 87 on the guide plate 85.

FIG. 2 shows the usage of a locking slide 91 in the unlocked position, which can therefore be moved radially forwards from the rear stop edge 87 in an arrow direction 89, whereby the locking plates 93 and 94, enlarged in thickness, are brought into the latching gap 72 of the respective latching connection 74 and therefore the latching feet 14 arranged in the area of the latching connection 74 bend outwards in the arrow direction 84, wherein the hook heads 107 arranged at the free, bendable end of the latching feet 14 define a load-transmitting, locked position of the trim part on the motor vehicle wheel 1.

If, in the transition from FIG. 2, the locking slide 91 is pushed radially inwards in the arrow direction 89 between the latching connections 74, the two latching plates 93, 94, the thickness of which has been increased, are therefore moved into the latching gap 72 of the respective latching connection 74 mentioned before and, in the position shown in FIG. 3, the locking slide is pressed downwards in the arrow direction 92 (see FIG. 5), whereby the barbed hook plates on the locking slide, which are arranged in the area of the locking plates 93, 94, come into a substantially non-detachable latching connection with the opposite barbed hook plates 76 of the counterholder 75 and therefore the locked position is established.

FIG. 4 shows the locking movement in arrow direction 92 towards the surface of the trim part 9, 10 and also the sliding movement in arrow direction 89.

The unlocking plate 86 with its rear stop edge 88 therefore abuts on the locking slide 91 in a load-transmitting manner and prevents its retracting movement in the opposite direction to the arrow direction 89 shown.

Only by a bending movement of the unlocking plate 86 in the arrow direction 90 can the stop edge 88 be disengaged from the opposite stop edge 104 (see FIG. 5) of the locking slide 91.

FIG. 5 shows a locking slide 91 in perspective representation. It can be seen that two spaced locking plates 93, 94 have a certain thickness 105 which is suitable for bending the assigned latching foot 14 outwards in the latching gap 72 in the arrow direction 84 (see FIG. 3), as a result of which the hook head 107 formed on the open end moves outwards.

FIG. 5 shows the displacement direction in arrow direction 89 and the lowering movement in arrow direction 92 for the locking slide 91.

The two locking plates 93, 94, enlarged in thickness 105, are connected to each other in one piece of material via a transverse yoke 95, reduced in thickness, wherein the transverse yoke 95 forms a downwardly directed recess 98 which forms a receiving profile which corresponds to the clear profile of the latching foot 14.

As shown in FIG. 2, the latching foot 14 in the unlocked position is in engagement with the recess 98, so that the locking slide 91 takes up a certain defined, unlocked securing position as securing layer.

The stop edge 96 defines the displacement position of the locking slide 91 into its locked position, wherein in the locked position the stop edge 96 fastens the front latching foot 14.

This limits the displacement movement in arrow direction 89 to reach the locked position.

As soon as this displacement position has been reached by the stop edge 96 on the front latching foot 14, it can be pressed downwards in the arrow direction 92 into the latching gap, whereby the two locking plates 93, 94 with their increased thickness 105 penetrate the latching gap 72 and the latching feet 14 bend outwards in the arrow direction 89.

It goes without saying that instead of a stop edge 96 on the locking slide 91, an assigned stop edge could also be arranged on the counterholder 75.

FIG. 6 shows the back of the locking slide 91, where it can be seen that the barbed hook plates 76 have a certain blocking profile, which locks essentially inseparable with the respective barbed hook plate 76 of the counterholder 75 when the locking slider 91 is pressed downwards in the arrow direction 92 and the barbed hook plates 77 engage with the barbed hook plates 76.

FIGS. 7 to 19 show another displacement guide for another embodiment of a locking slide 101, wherein the guide plate 95 previously shown in FIGS. 1 and 2 is omitted and instead an internal guide with a guide groove 102 is provided in the locking slide 101.

Therefore, instead of the guide plate 85, a latching plate 99 is provided which engages with its profile in an assigned guide groove 102 of the locking slide 101 and guides the locking slide on the latching plate 99 in a displaceable manner.

To limit the lifting and lowering movement of the locking slide 101, the latching plate 99 carries a latching lip 100.

FIGS. 8 and 9 show another details of such a displacement guide.

The latching plate 99 is integrally formed on the surface of the trim part 9, 10 at a distance from the latching connections 74 described above, which are spaced apart from each other.

The unlocking plate 86, with the same function as described above, is drawn, FIG. 9 shows the latching lip 100 mentioned before, which protrudes laterally from the surface of the latching plate 99 in order to allow a limitation of the lifting movement of the locking slide 101. This means that it can no longer be lifted upwards from its locked position.

FIG. 10 shows that a locking slide 101 is now installed on the left-hand side of the two latching connections 74, which is in its unlocked position and the two latching plates 93, 94, enlarged to a thickness of 105, are still disengaged from the latching gap 72 of the two latching connections 74 arranged one behind the other.

It can be seen that the locking slide 101 rests on the latching plate 99 and the upper side of the latching plate engages in the assigned guide groove 102 of the locking slide 101.

The same explanation also applies to FIGS. 11 and 12, where it can be seen that the locking slide 101 with its two locking plates 93, 94 can now be moved to the right in the arrow direction 89 and then, after reaching a certain stop position in the arrow direction 92, be pressed downwards into the latching gap 72.

FIG. 12 shows the same unlocked position of the locking slide 101 as shown in FIG. 11, but this representation is rotated by 90°.

FIG. 13 shows in comparison to FIG. 10 that the locking slide 101 was brought into its locked position and lowered in arrow direction 92, while—for better clarity—the upper latching connection 74 is still shown without the locking slide 101 inserted.

The locking slide is still guided with its last part on the latching plate 99 and remains engaged there. Further, it can be seen that the stop edge of the unlocking plate 86 abuts on the side stop edges of the locking slide 101 and that it is no longer possible for the locking slide 101 to retract in the radial direction against the arrow direction 89.

The unlocking plate 86 is positioned between two stop edges 103 and 106 (see FIG. 18) in the area of the groove recess and the transverse yoke 95 on the locking slide 101, and the latter can then no longer be displaced in its longitudinal extension.

In order to facilitate the displacement movement of the locking slide 101 in its displacement directions, bevelled chamfers 97 are arranged at the front edges of the locking plates 93, 94 in order to facilitate a corresponding the slide guide at the locking feet 14.

It is added that the limitation of the displacement movement of the locking slide 91, 101 can also be achieved by a front stop edge 104 (see FIG. 5), which can abut against an assigned counter surface. This has been described in particular in connection with the locking slide 91 in FIGS. 1 to 6.

The advantage of forming a locking slide 91, 101 in the area of a latching connection 74 for determination of a trim part 9, 10 to a motor vehicle wheel 1 is that it is a non-destructively disassembled connection, because the described locking slide 91, 101 can come into engagement with the latching connection 74 by suitable displacement and lifting movements, but can also be disengaged from the latching connection 74. This has not been possible so far.

The locking slides 91, 101 are simple plastic parts which can also be designed as metal parts. The plastic parts essentially consist of two spatially separated locking plates 93, 94, which are connected to each other by a transverse yoke 95 with reduced thickness.

On one side, the locking plates 93, 94 are equipped with the aforementioned barbed hook plates 77, while the opposite sides are smooth to provide smooth, load-transmitting contact surfaces on the assigned outwardly bendable latching feet 14.

This smooth surface enables large-area load transfer and effective bending stress on the latching feet 14.

The central recess 98 described above serves to engage a latching foot 14 to secure the position in order to achieve an assembling position from which the locking slide 91, 101 is then moved in the radial displacement direction shown into the area of the latching connections 74 arranged at a distance from one another, which are therefore expanded apart.

The locking slide 91, 101 is therefore an expanding tool which expands the latching connections 74 and prestresses the latching feet 14, which form part of the latching connections 74, to the outside with a high clamping force against counter surfaces on the wheel side.

DRAWINGS KEY

1 Motor vehicle wheel
2 Spoke
3 Spoke
4
5
6 Wheel ring
7
8
9 Trim part (small)
10 Trim part (large)
11
12
13
14 Latching foot
15
16
17
18
19
20
21
22
23
24
25
26
27
28
29
30
31
32
33
34
35
36
37
38
39
40
41 Latching slide
42
43
44
45
46
47
48
49
50
51
52
53
54
55
56
57
58
59
60
61
62
63
64
65
66
67
68
69
70
71
73 Latching gap
73

74 Latching connection
75 Counterholder
76 Barbed hook plate
77 Barbed hook plate
78
79
80
81
82
83
84 Arrow direction
85 Guide plate
86 Unlocking plate
87 Stop edge (from 85)
88 Stop edge (from 86)
89 Arrow direction
90 Arrow direction (for 86)
91 Locking slide (FIG. 1-9)
92 Arrow direction (from 91)
93 Locking plate (from 91)
94 Locking plate (from 91)
95 Transverse yoke (from 91)
96 Stop edge (from 91)
97 Chamfer
98 Recess
99 Latching plate
100 Latching lip
101 Locking slide
102 Guide groove (from 101)
103 Stop edge
104 Stop edge
105 Thickness
106 Stop edge
107 Hook head

The invention claimed is:

1. A decorative trim panel on a motor vehicle wheel, comprising:
   at least one plate-shaped trim part which at least partially covers a visible side of the motor vehicle wheel,
   a latch mounted at the trim part for attaching the decorative trim panel in a load-transmitting manner to at least one spoke and/or to a rim ring of the wheel,
   the latch at the trim part comprises at least one latching foot which is integrally formed with the trim part, the latching foot comprises a hook head integrally formed thereon,
   the latching foot is part of a latching connection on the trim part,
   the latching connection further comprises a locking slide selectively positionable in a latching gap of the latching connection with the plate-shaped trim part at least partially covering the visible side of the motor vehicle wheel and the hook head positioned with the motor vehicle wheel interposed between the hook head and the plate-shaped trim part, the locking slide formed to be displaceable and lockable in a locking position in the latching gap of the latching connection and configured, in the locking position, for pressing the latching foot towards the plate-shaped trim part and thereby selectively consolidating the latching connection the locking slide displaceable from the locking position to selectively release the latching connection.

2. The decorative trim panel according to claim 1, wherein the locking slide is displaceable in a perpendicular direction to a radial surface of the trim part into the locking position.

3. The decorative trim panel according to claim 1, wherein the locking slide is displaceable in a radial direction of the trim part and the motor vehicle wheel and parallel to the surface of the trim part.

4. The decorative trim panel according to claim 1, wherein the locking slide comprises an expander in the latching gap of the latching connection, which, in accordance with the displacement of the locking slide, widens the latching gap between a counterholder and the latching foot to bend or return the latching foot towards the plate-shaped trim part.

5. The decorative panel according to claim 1, wherein a displacement guide of the locking slide in a radial direction of the trim part and of the wheel comprises a guide plate which abuts against an outer surface of the locking slide and is integrally formed on the trim part.

6. The decorative trim panel according to claim 1, wherein a displacement guide of the locking slide in a radial direction of the trim part and of the wheel comprises a latching plate integrally formed on the trim part, the latching plate engages in a guide groove arranged on an underside of the locking slide.

7. The decorative trim panel according to claim 1, wherein a displacement of the locking slide is limited by a bendably formed unlocking plate which selectively limits or releases a displacement path of the locking slide.

8. The decorative trim panel according to claim 7, wherein the unlocking plate forms a front stop edge for the locking slide so that when the unlocking plate is bent backwards by means of a suitable tool or the human hand, the locking slide is disengageable from the front stop edge and brought into its retracted unlocked position until the locking slide fastens the guide plate on a stop edge.

9. A decorative trim panel on a motor vehicle wheel, comprising:
   at least one plate-shaped trim part which at least partially covers a visible side of the motor vehicle wheel,
   a latch mounted at the trim part for attaching the decorative trim panel in a load-transmitting manner to at least one spoke and/or to a rim ring of the wheel,
   the latch at the trim part comprises at least one latching foot which is integrally formed with the trim part, the latching foot comprises a hook head integrally formed thereon,
   the latching foot is part of a latching connection on the trim part,
   the latching connection further comprises a locking slide which is formed to be displaceable and lockable in a locking position in the latching gap of the latching connection and configured for bending or returning the latching foot towards the plate-shaped trim part and thereby selectively consolidating or releasing the latching connection, wherein the locking slide comprises two locking plates of a specific thickness which are arranged at a distance from one another and are suitable for bending the latching foot outwards from the latching gap, as a result of which the hook head integrally formed at a free end of the latching foot moves outwards to bend or return the latching foot towards the plate-shaped trim part.

10. The decorative trim panel according to claim 9, wherein the two locking plates have an enlarged thickness and are connected to one another in one piece of material via a transverse yoke reduced in thickness, and in that the transverse yoke forms a downwards directed opened recess which corresponds to a clear profile of the latching foot.

11. The decorative trim panel according to claim 2, wherein the locking slide is displaceable in a radial direction of the trim part and the motor vehicle wheel and parallel to the surface of the trim part.

12. The decorative trim panel according to claim 2, wherein the locking slide comprises an expander in the latching gap of the latching connection, which, in accordance with the displacement of the locking slide, widens the latching gap between a counterholder and the latching foot to bend or return the latching foot towards the plate-shaped trim part.

13. The decorative trim panel according to claim 3, wherein the locking slide comprises an expander in the latching gap of the latching connection, which, in accordance with the displacement of the locking slide, widens the latching gap between a counterholder and the latching foot to bend or return the latching foot towards the plate-shaped trim part.

14. The decorative panel according to claim 2, wherein a displacement guide of the locking slide in a radial direction of the trim part and of the wheel comprises guide plates which abut against the outer surfaces of the locking slide and are integrally formed on the trim part.

15. The decorative panel according to claim 3, wherein a displacement guide of the locking slide in the radial direction of the trim part and of the wheel comprises a guide plate which abuts against an outer surface of the locking slide and is integrally formed on the trim part.

16. The decorative panel according to claim 4, wherein a displacement guide of the locking slide in the radial direction of the trim part and of the wheel comprises a guide plate which abuts against an outer surface of the locking slide and is integrally formed on the trim part.

17. The decorative trim panel according to claim 2, wherein a displacement guide of the locking slide in a radial direction of the trim part and of the wheel comprises a latching plate integrally formed on the trim part, the latching plate engages in a guide groove arranged on an underside of the locking slide.

18. The decorative trim panel according to claim 3, wherein a displacement guide of the locking slide in a radial direction of the trim part and of the wheel comprises a latching plate integrally formed on the trim part, the latching plate engages in a guide groove arranged on an underside of the locking slide.

19. The decorative trim panel according to claim 4, wherein a displacement guide of the locking slide in a radial direction of the trim part and of the wheel comprises a latching plate integrally formed on the trim part, the latching plate engages in a guide groove arranged on an underside of the locking slide.

20. A decorative trim panel on a motor vehicle wheel, comprising:
   at least one plate-shaped trim part which at least partially covers a visible side of the motor vehicle wheel,
   a latch mounted at the trim part for attaching the decorative trim panel in a load-transmitting manner to at least one spoke and/or to a rim ring of the wheel,
   the latch at the trim part comprises at least one latching foot which is integrally formed on with the trim part, the latching foot comprises a hook head integrally formed thereon,
   the latching foot is part of a latching connection on the trim part,
   the latching connection further comprises a locking slide which is formed to be displaceable and lockable in a locking position in the latching gap of the latching connection and configured for bending or returning the latching foot towards the plate-shaped trim part and thereby selectively consolidating or releasing the latching connection, wherein a displacement guide of the locking slide in a radial direction of the trim part and of the wheel comprises a latching plate integrally formed on the trim part, the latching plate engages in a guide groove arranged on an underside of the locking slide.

\* \* \* \* \*